US006560468B1

(12) United States Patent
Boesen (10) Patent No.: US 6,560,468 B1
(45) Date of Patent: May 6, 2003

(54) CELLULAR TELEPHONE, PERSONAL DIGITAL ASSISTANT, AND PAGER UNIT WITH CAPABILITY OF SHORT RANGE RADIO FREQUENCY TRANSMISSIONS

(76) Inventor: Peter V. Boesen, 4026 Beaver Ave., Des Moines, IA (US) 50310

( * ) Notice: Subject to any disclaimer, the term of this patent is extended or adjusted under 35 U.S.C. 154(b) by 0 days.

(21) Appl. No.: 09/416,168

(22) Filed: Oct. 11, 1999

Related U.S. Application Data (63) Continuation-in-part of application No. 09/309,107, filed on May 10, 1999, now Pat. No. 6,094,492.

(51) Int. Cl.[7] .................................................. H04B 1/38
(52) U.S. Cl. ......................... 455/568; 455/569; 455/90; 381/151
(58) Field of Search ................................ 455/569, 568, 455/573, 556; 381/312, 326, 23.1, 311, 151, 112; 345/864

(56) References Cited

U.S. PATENT DOCUMENTS

| | | | |
|---|---|---|---|
| 4,334,315 A | * 6/1982 | Ono et al. | ............. 128/201.19 |
| 4,588,867 A | 5/1986 | Konomi | ...................... 179/107 |
| 4,654,883 A | 3/1987 | Iwata | |
| 4,682,180 A | 7/1987 | Gans | |
| 4,791,933 A | 12/1988 | Schreiber | |
| 5,189,632 A | * 2/1993 | Paajanen et al. | ........ 364/705.05 |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |

(List continued on next page.)

FOREIGN PATENT DOCUMENTS

| | | |
|---|---|---|
| EP | 0 776 140 A1 | 5/1997 |
| EP | 0 873 031 A1 | 10/1998 |
| GB | 2 074 817 A | 11/1981 |

(List continued on next page.)

OTHER PUBLICATIONS

"U.S. Will Oversee Cell–Phone Safety Studies", www.cmp-net.com.
"Wireless Worries: Are Cell Phones A Danger to You and Your Children", ABC News May 26, 2000.

(List continued on next page.)

Primary Examiner—Thanh Cong Le
Assistant Examiner—Nick Corsaro
(74) Attorney, Agent, or Firm—McKee, Voorhees & Sease, P.L.C.

(57) ABSTRACT

A cellular telephone system, including a cellular telephone transceiver unit, an ear piece which receives the voice vibrations of a user, and a wireless linkage operatively connecting the ear piece to the cellular telephone transceiver unit, allows a user to be in a hands-free mode when using a cellular telephone. The cellular telephone transceiver unit includes a personal digital assistant and a pager with a vibration module. The ear piece generally uses a bone sensor along with an air sensor placed in the external auditory canal of the user to detect the voice vibrations of the user. Further, a speaker is included in the ear piece to allow the user to hear incoming data from the cellular telephone transceiver. The wireless linkage uses low power radio frequency waves to send and receive signals between the ear piece and the cellular telephone transceiver unit. Both the ear piece and the cellular telephone transceiver unit require power which is supplied by batteries. Both the ear piece and the cellular telephone transceiver may be recharged by simply placing them in a docking station.

53 Claims, 2 Drawing Sheets

U.S. PATENT DOCUMENTS

| | | | |
|---|---|---|---|
| 5,298,692 A | | 3/1994 | Ikeda et al. |
| 5,422,934 A | | 6/1995 | Massa |
| 5,613,222 A | | 3/1997 | Guenther |
| 5,625,673 A | | 4/1997 | Grewe et al. |
| 5,657,370 A | * | 8/1997 | Tsugane et al. ......... 379/433.12 |
| 5,659,620 A | | 8/1997 | Kuhlman |
| 5,692,059 A | * | 11/1997 | Kruger ....................... 381/151 |
| 5,715,524 A | * | 2/1998 | Jambhekar et al. .......... 455/128 |
| 5,721,783 A | | 2/1998 | Anderson |
| 5,758,294 A | | 5/1998 | Ganesan et al. |
| 5,771,438 A | | 6/1998 | Palermo et al. |
| 5,786,106 A | | 7/1998 | Armani |
| 5,797,089 A | | 8/1998 | Nguyen |
| 5,802,167 A | | 9/1998 | Hong |
| 5,894,595 A | | 4/1999 | Foladare et al. |
| 5,898,908 A | | 4/1999 | Griffin et al. |
| 5,929,774 A | | 7/1999 | Charlton |
| 5,930,729 A | | 7/1999 | Khamis et al. |
| 5,933,506 A | | 8/1999 | Aoki et al. |
| 5,983,073 A | | 11/1999 | Ditzik |
| 5,987,146 A | | 11/1999 | Pluvinage et al. |
| 6,021,207 A | | 2/2000 | Puthuff et al. |
| 6,047,196 A | | 4/2000 | Makela et al. |
| 6,052,603 A | | 4/2000 | Kinzalow et al. ............ 455/462 |
| 6,073,031 A | | 6/2000 | Helstab et al. .............. 445/557 |
| 6,081,724 A | | 6/2000 | Wilson |
| 6,112,103 A | | 8/2000 | Puthuff |
| 6,128,475 A | | 10/2000 | Wicks et al. |
| 6,167,039 A | | 12/2000 | Karlsson et al. |
| 6,181,801 B1 | * | 1/2001 | Puthuff et al. .............. 381/328 |
| 6,201,977 B1 | * | 3/2001 | Cathey et al. .............. 455/343 |
| 6,230,029 B1 | * | 5/2001 | Hahn et al. .................. 379/430 |
| 6,240,302 B1 | * | 5/2001 | Harrison ..................... 455/556 |
| 6,234,595 B1 | | 6/2001 | Lee et al. |
| 6,272,227 B1 | * | 8/2001 | Yanagisawa ................ 381/104 |
| 6,308,074 B1 | * | 10/2001 | Chandra et al. ............. 455/100 |
| 6,324,412 B1 | * | 11/2001 | Alen et al. .................... 429/98 |
| 6,370,362 B1 | | 4/2002 | Hansen et al. |
| 6,442,637 B1 | | 8/2002 | Hawkins et al. |

FOREIGN PATENT DOCUMENTS

| | | |
|---|---|---|
| JP | 10163939 A | 6/1998 |
| JP | 00022670 A | 1/2000 |
| WO | WO 01/3605 A2 | 2/2001 |
| WO | WO 01/13222 A3 | 2/2001 |
| WO | WO 01/13222 A2 | 2/2001 |
| WO | WO 01/13605 A3 | 2/2001 |
| WO | WO 91/13204 A1 | 2/2001 |
| WO | WO 01/77786 A2 | 10/2001 |
| WO | WO 0177786 A3 | 10/2001 |
| WO | WO 01/77817 A1 | 10/2001 |

OTHER PUBLICATIONS

"A One–Size Disposable Hearing Aid is Introduced", The Hearing Journal, April 2000, vol. 53, No. 4.

"Hearing In Noise", The Hearing Review Jan. 1999; Siemens.

"Blue Tooth Usage Model" The Official Bluetooth Website.

Bell Laps, Wireless Research Laboratory, Internet pages printed Jun. 26, 2000.

Article entitled, "Wireless Future Sizzles," by Keith Darce, The Times–Picayne, Sep. 26, 1999.

Article entitled, "Handhelds that do it all," by Larry Armstrong, Business Week, Feb. 12, 2001.

Article entitled, "5th International Conference on Wearable Computing" by Rick Johnson, Pen Computing Magazine, August 2000.

"Scientist link eye cancer to mobile phones," by Jonathan Leake: Jan. 14, 2001; http://www.sunday–times.co.uk/news/pages/sti/2001/01/14/stinwenws0132.html.

"Air Magic Wireless Headset User's Guide", as early as October, 2000.

* cited by examiner

CELLULAR TELEPHONE, PERSONAL DIGITAL ASSISTANT, AND PAGER UNIT WITH CAPABILITY OF SHORT RANGE RADIO FREQUENCY TRANSMISSIONS

This application is filed as a continuation-in-part of U.S. patent application Ser. No. 09/309,107 filed on May 10, 1999, now U.S. Pat. No. 6,094,492.

BACKGROUND OF THE INVENTION

1. Field of the Invention

The present invention relates generally to the cellular telephone industry, and more particularly to a hands-free cellular telephone system, including a personal digital assistant with pager capabilities.

2. Problems in the Art

Conventional cellular telephones, which have become extremely popular, use high frequency radio waves to transmit and receive data. They also generate extensive electromagnetic fields. Such high frequency waves and electromagnetic fields have been linked to cancer and other serious health problems. There is therefore a need to protect cellular telephone users from such potentially harmful effects.

Additionally, conventional cellular telephones require a user to hold the telephone and thereby cause the user to lose the use of that hand for driving or other purposes. Users have attempted to solve this problem by holding the cellular telephone in a manner which frees up both of the user's hands. However, this may cause other problems, such as limiting the user's field of view, range of motion, or causing discomfort. This presents potentially hazardous conditions for the user and others. There exists a need to free up both hands of a user for driving and other purposes.

Further, current systems and methods of operating a cellular telephone in a hands-free fashion have resulted in unsightly attachments which must be worn by the user. Microphones that are worn by a user tend to protrude into the facial area of the user and interfere with the user during times when it is desirable not to use the cellular telephone such as eating, drinking, and other day to day activities. Though such microphones may be adjusted and placed away from the user's facial area or removed during times when the cellular telephone is not in use, such adjustments are unnecessarily burdensome. It is therefore desirable to have a hands-free system capable of being worn by the user at all times without interfering in the day to day activities of the user.

Other forms of hands-free operation of a cellular telephone have placed the microphone away from the user's facial area. Such placement results in a loss of clarity of the user's voice and tends to interject other surrounding sounds, such as wind, traffic, radio, and other voices into the transmission of the user's voice.

Currently, cellular phones are beginning to merge with personal digital assistants for convenience purposes. A user can use the personal digital assistant and then use the cellular phone at a separate time. However, the combination typically prevents simultaneous use because the cellular telephone must be held close to the user's head, making the personal digital assistant inaccessible. It is therefore desirable to be able to access the personal digital assistant while using the cellular telephone.

There is therefore a need for a hands-free cellular telephone system which avoids these and other problems.

Features of the Invention

A general feature of the present invention is the provision of an improved cellular telephone system which overcomes the problems found in the prior art.

A further feature of the present invention is the provision of a cellular telephone system which prevents the user's head from exposure to the potentially harmful emissions of current cellular telephones.

A further feature of the present invention is the provision of a cellular telephone system capable of hands-free operation.

Another feature of the present invention is the provision of a cellular telephone system capable of being worn by a user without interfering in a user's day to day activities.

A still further feature of the present invention is the provision of a cellular telephone capable of transmitting a user's voice while avoiding the transmission of surrounding sounds.

Another feature of the present invention is the provision of a cellular telephone system capable of providing hands-free use of a cellular telephone while maintaining access to a built-in personal digital assistant.

A still further feature of the present invention is the provision of one device which can function as a cellular telephone, a personal digital assistant, or a pager.

These, as well as other features and advantages of the present invention, will become apparent from the following specification and claims.

SUMMARY OF THE INVENTION

The present invention generally comprises a cellular telephone transceiver, an ear piece which receives the voice vibrations of a user, and a wireless linkage operatively connected between the two. When worn by a user, the ear piece receives the bone and air conductive voice vibrations transmitted through the user's external auditory canal and converts them into electrical signals. These electrical signals are then converted to short range low frequency radio waves and sent to the cellular transceiver. The cellular transceiver unit then acts like a cellular telephone, a personal digital assistant and a pager.

In a preferred embodiment, the present invention includes a cellular transceiver unit which includes a standard telephone keypad and a display. The display is preferably part of the personal digital assistant and can tell the user when an incoming telephone call, e-mail message, or page arrives. The keypad can be flipped up to reveal the touch screen of the personal digital assistant to allow the user to keep track of appointments, phone numbers, and other personal and business information. The personal digital assistant can also use the cellular connection to access the internet and other sources of information. This allows the user to respond to e-mail messages, check stock prices, book hotels and perform a variety of other tasks.

DETAILED DESCRIPTION OF THE PREFERRED EMBODIMENT(S)

The present invention will be described as it applies to its preferred embodiment. It is not intended that the present invention be limited to the described embodiment. It is intended that the invention cover all modifications and alternatives which may be included within the spirit and scope of the invention.

Figure 1:
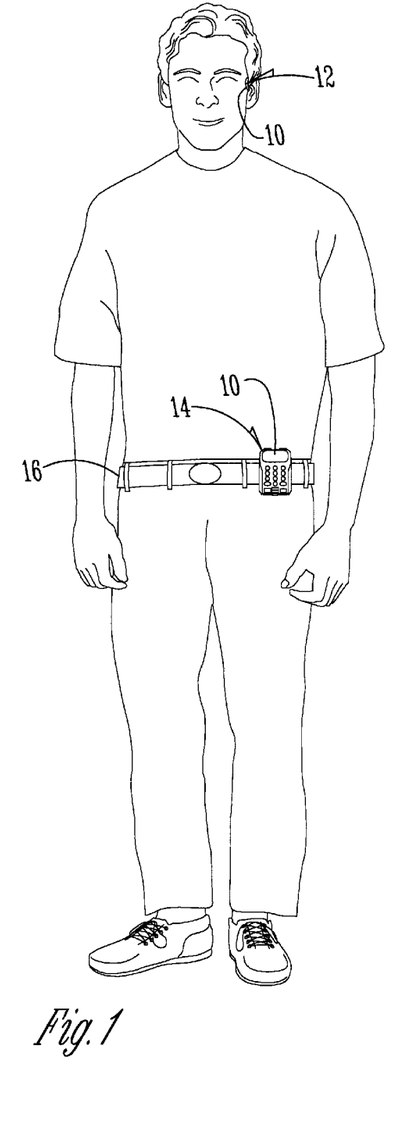
FIG. 1 is a pictorial view showing a user wearing the cellular telephone system of the present invention.

Now, referring to the drawings, FIG. 1 illustrates the cellular telephone system 10 as worn by a user. The user wears the ear piece 12 and the cellular transceiver unit 14. The cellular transceiver unit 14 may be worn on the user's belt 16, though it is also possible to store the cellular transceiver unit 14 in a number of other areas which may be convenient for the user, such as a shirt pocket, coat pocket, or vest pocket.

Figure 2:
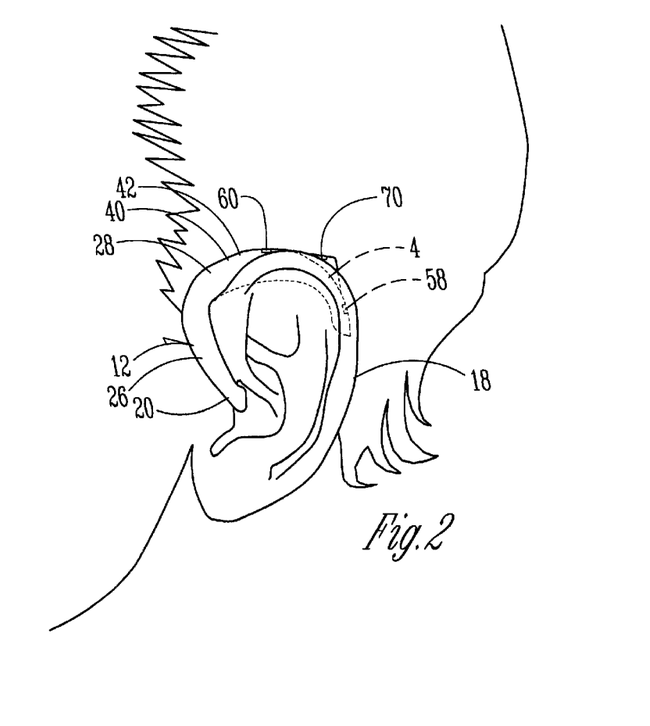
FIG. 2 is a perspective view of the ear piece unit of the cellular telephone system of the present invention.

As seen in FIG. 2, the ear piece 12 includes an external ear canal portion 20 having a bone conduction sensor 22 in contact with the external auditory canal epithelium of the user, an air conduction sensor or microphone 46, and a speaker 24. A casing 26 is also provided, having an ear attachment portion 28 and a fitting portion 30 that connects the ear attachment portion 28 with the bone conduction sensor 22, the air conduction sensor 46, and speaker 24. The ear attachment portion 28 is contoured to comfortably fit into the angle between the ear auricle and the temporal bone of the skull of the user and is preferably made of a lightweight aluminum or plastic material. It can be appreciated that the primary purpose of the ear attachment portion 28 is to secure the ear piece 12 in proper position. The fitting portion 30 is integral with the ear attachment portion 28 and is reinforced with a flexible wire (not shown) so that the ear piece 12 may be adapted to fit the user and maintain the bone conduction sensor 22 and the air conduction sensor 46 in their proper positions with the external auditory canal 34 of the user.

Figure 3:
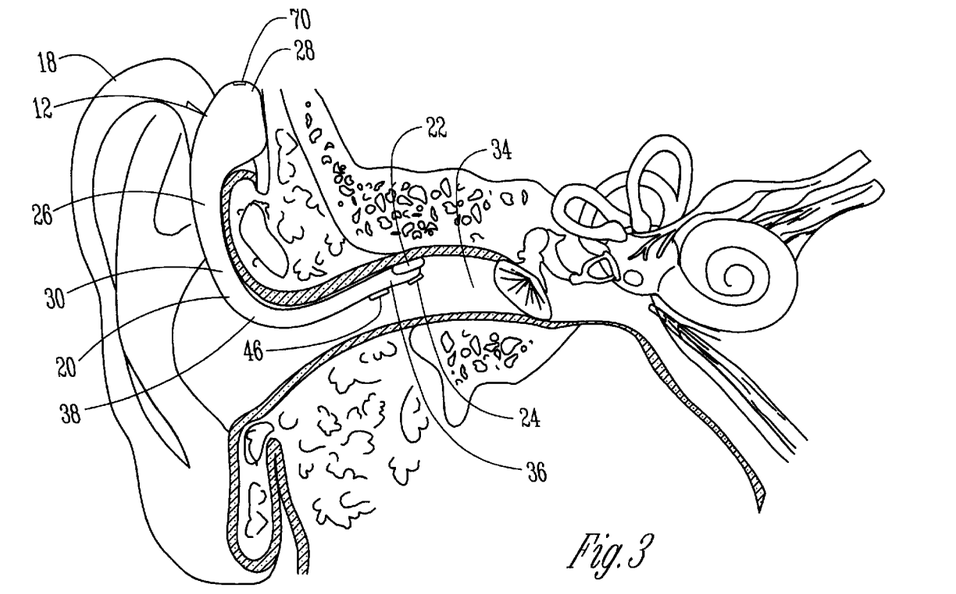
FIG. 3 is a cross-sectional view of the ear piece unit of FIG. 2 taken through the external auditory canal of the user.

As is best shown in FIG. 3, the ear piece 12 should be fit so that the bone conduction sensor 22 is in contact with a portion of the external auditory canal 34 near the bonycartilaginous junction. It is preferred that the bone conduction sensor 22 rest against the posterior superior wall of the external auditory canal 34, with the flexible wire (not shown) of the fitting portion 30 shaped to bias the bone conduction sensor 22 into position. Fitting the device and calibrations may be performed by the user or with the assistance of a physician or an audiologist/audiology technician.

The bone conduction sensor 22 is a piezoelectric accelerometer of standard construction and may be obtained from Endevco Industries, among others. Other pick-ups that can be used with the present invention include, but are not limited to, those of the magnetic type, electric condenser type, IC type, and semiconductor type. All are well-known in the art.

The external ear canal portion 20 is formed so that the bone conduction sensor 22 may be inserted into the external auditory canal 34 of the user and nonocclusively contact against the posterior superior wall of the bony canal. The bone conduction sensor 22 is intended to pick up, as the voice signals, the vibrations of the upper wall of the external auditory canal 34 at the time of uttering the voice sounds. When the user utters voice sounds, these sounds reach the mastoid bones. These sound vibrations in the external auditory canal portion in contact with the bone sensor 22 are then processed.

In addition to the bone conduction sensor 22, the external ear canal portion 20 also includes an air conduction sensor or microphone 46. Like the bone conduction sensor 22, the air conduction sensor 46 is of standard construction and may be obtained from various hearing aid manufacturers, such as ReSound, Siemens AG, and Oticon with numerous small air microphones available which would process sound from air transmission.

A resilient member 36 is preferably positioned between the air conduction sensor 46 and the bone conduction sensor 22 in such a manner that the external sound collected by the air conduction sensor 46 will not be transmitted to the bone conduction sensor 22.

Additionally, the ear canal portion 20 also includes a speaker 24. The speaker 24 is of a type well known in the art and common in the hearing aid industry. The speaker 24 is positioned directly in line with the tympanic membrane to facilitate clear transmissions while maintaining a low power output.

A circuit portion 38 transmits the electrical signals from both the bone conduction sensor 22 and the air conduction sensor 46 to a speech processor 40. The bone conduction sensor 22 and the air conduction sensor 46 are both tuned to receive frequencies within the range of audible human speech, approximately 50 to 8000 Hertz.

The speech processor 40 is of a conventional construction used in many hearing aids and employs a digital processing scheme to package the voice signal for transmission across a wireless linkage. The speech processor 40 will be programmed to extract similarities from air and bone transmission, comparing the similarities in signal and then transmitting via a wireless linkage to a cellular telephone transceiver or other receiving device. The speech processor 40 also filters out through band pass filters 42 sounds outside the frequency of normal human speech.

The speech processor 40 samples a portion of the electrical signals of voice sound information from the air conduction sensor 46 and a portion of the electrical signals of voice sound information from the bone conduction sensor 22.

The speech processor 40 then transmits the selected voice signal to an ear piece transceiver 4. The ear piece transceiver 4 is preferably a wireless radio frequency transceiver well known in the art which includes a multi directional antenna 70.

The ear piece transceiver 4 sends the voice signal to the cellular transceiver unit 14. The ear piece transceiver 4 also receives incoming signals from the cellular transceiver unit 14 and sends them to the speaker 24.

Figure 4:
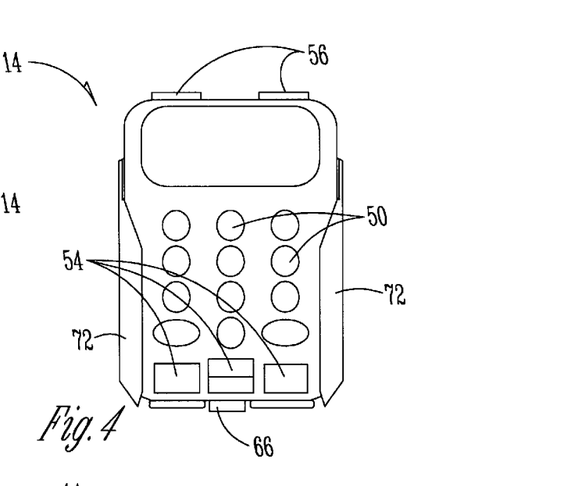
FIG. 4 is a perspective view of the transceiver unit of the cellular telephone system of the present invention.

As shown in FIG. 4, the cellular transceiver unit 14 appears like the front of a normal cellular telephone and is worn by the user via a clip 72 which is secured to the user's belt. The cellular transceiver unit 14 uses a conventional cellular transceiver to provide cellular communications. The cellular transceiver unit 14 includes a standard twelve key keypad 50, other function buttons 54, and a display 52. The cellular telephone display 52 is preferably an LCD display incorporated as part of a personal digital assistant such as the current Palm Pilot® series of devices using the Palm OS®, Windows CE®, or other operating system, though separate displays may be used for the personal digital assistant and the cellular telephone display 52.

Figure 5:
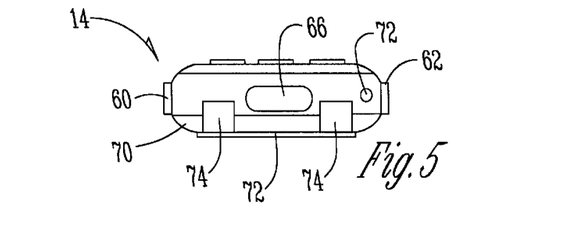
FIG. 5 is a bottom view of the transceiver unit of FIG. 4.

Further, the cellular transceiver unit 14 includes componentry which is common in the art. As shown in FIG. 5, the cellular transceiver unit 14 receives the relatively low powered radio frequency (RF) signals from the ear piece transceiver 4 via an RF local area network antenna 60, processes the signal and transmits an amplified RF signal through the conventional cellular transceiver. Further, the cellular transceiver unit 14 receives incoming data through a cellular linkage antenna 62 and transmits this to the ear piece transceiver 4 using the low powered RF antenna (60) to transmit signals. The cellular transceiver unit 14 may transmit or receive using analog or digital technology.

Figure 6:
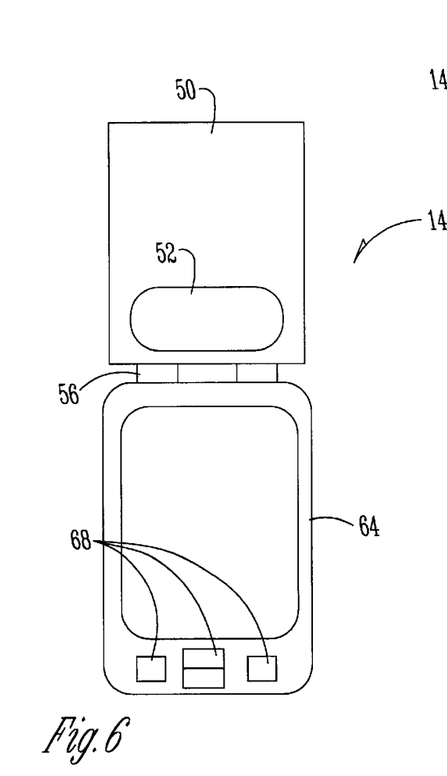
FIG. 6 is a perspective view of the transceiver unit with the cellular telephone interface flipped up to reveal the personal digital assistant of the present invention.

The cellular transceiver unit 14 is also equipped with a personal digital assistant portion 64. To access the personal digital assistant portion 64, a user presses an access button 66 to flip up the keypad 50 or the entire cellular telephone interface. The personal digital assistant portion may also appear on the opposite side of the cellular transceiver unit 14. The keypad 50 flips up via two hinges 56 on top of the cellular transceiver unit 14. With the personal digital assistant portion 64 exposed, a user can enter commands using a traditional stylus or the user's finger. Personal digital assistant buttons 68, which are common in the art, allow the user to access various functions of the personal digital assistant. The personal digital assistant is operatively linked to the cellular transceiver to provide a linkage with which the personal digital assistant may access the internet or other services. The personal digital assistant allows the user to keep track of appointments, phone numbers and other personal and business information. The personal digital assistant also allows the user to receive and send e-mail messages, browse the internet for stock prices, hotel reservations, and a perform a variety of other tasks. Additionally, an access port, 72 is included on the bottom of the cellular transceiver unit 14 to allow the user to connect a keyboard, another cellular phone, another personal digital assistant, or other peripherals.

Both the cellular transceiver unit 14 and the ear piece 12 require power. This power is supplied by one or more conventional rechargeable batteries 58 for the ear piece (12) and (30) for the cellular transceiver (14) which may include a vibration system to alert the user to an incoming call, page or e-mail. A separate vibration module 72 may be included which would operatively connect to the cellular transceiver unit 14. Further, both the ear piece 12 and the cellular transceiver unit 14 include contacts 74 (not shown on ear piece (12) which allow the user to simply place them in a docking station so as to be electrically connected to the docking station. The docking stations are conventional and are such that they remain connected to a power source such as a typical wall outlet or other power outlet. The docking station may be able to power both the ear piece 12 and the cellular transceiver unit 14 at the same time.

In an alternative embodiment of the present invention, a conventional cellular transceiver may be adapted to operatively connect the ear piece 12 to an existing cellular telephone, or to the cellular transceiver (14) to an existing cellular phone to permit wireless linkage via the low power RF transmissions to the ear piece (12).

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A cellular telephone system comprising:
   a cellular telephone transceiver unit having a cellular telephone and a short range transceiver operatively connected to the cellular telephone;
   an ear piece adapted to be inserted into the external auditory canal of a user to convert bone conductive voice vibrations of voice sound information of the user to electrical signal, the ear piece being smaller in size than the interior of the external auditory canal whereby the ear piece does not block the canal;
   the ear piece including a speaker being adapted to reside within the external auditory canal of the user;
   a transceiver electrically connected with the ear piece in operative communication with the short range transceiver of the cellular telephone transceiver unit.

2. The cellular telephone system of claim 1 wherein the cellular telephone transceiver unit is powered by one or more batteries.

3. The cellular telephone system of claim 2 further comprising:
   a docking station for the cellular telephone transceiver unit adapted to charge one or more batteries of the cellular telephone transceiver unit.

4. The cellular telephone system of claim 1 wherein the ear piece is powered by one or more batteries.

5. The cellular telephone system of claim 4 further comprising:
   a docking station adapted to recharge one or more batteries of the ear piece.

6. The cellular telephone system of claim 1 wherein the ear piece includes an air conduction sensor being adapted to convert air vibrations of voice sound information in the external auditory canal of the user to electrical signals.

7. The cellular telephone system of claim 6 further comprising:
   a speech processor operatively connected with the ear piece, the speech processor being adapted to receive the electrical signals from the bone conduction sensor and the air conduction sensor and produce a voice sound signal.

8. The device of claim 7 wherein the speech processor obtains a first sample of the electrical signals from the bone conduction sensor and a second sample of the electrical signals from the air conduction sensor and compares the first and second samples to capture the voice sound information of the user and filter noise.

9. The cellular telephone system of claim 1 wherein the cellular telephone transceiver unit includes a personal digital assistant.

10. The cellular telephone system of claim 1 wherein the cellular telephone transceiver unit includes a vibration module.

11. The cellular telephone system of claim 1 wherein the cellular telephone transceiver unit includes a pager.

12. A method of hands-free communication on a cellular telephone comprising:
    providing a cellular telephone transceiver unit;
    providing an ear piece adapted to be inserted into the external auditory canal of a user to convert bone conductive voice vibrations of voice sound information of the user to electrical signals, the ear piece having a bone conduction sensor and a speaker;
    providing a wireless linkage operatively connecting the ear piece to the cellular telephone transceiver unit;
    receiving via a cellular telephone transceiver an incoming radio signal from an external cellular transmitter;
    converting an incoming radio signal to an audible signal which can be heard by a user via the speaker disposed within the external auditory canal of the user;

receiving via the cellular telephone transceiver unit the electrical signals from the ear piece as sent by the wireless linkage; and sending an outgoing radio signal from the cellular telephone transceiver unit to an external cellular receiver.

13. The method of hands-free communication on a cellular telephone of claim 12 wherein the wireless linkage includes a radio frequency transmitter operatively connected to the ear piece and a radio frequency receiver operatively connected to the cellular telephone transceiver unit.

14. The method of hands-free communication on a cellular telephone of claim 12 wherein the ear piece includes an air conduction sensor being adapted to convert air vibrations of voice sound information in the external auditory canal of the user to electrical signals.

15. The method of hands-free communication on a cellular telephone of claim 12 wherein the cellular telephone transceiver unit includes a personal digital assistant.

16. A hands-free device adapted for use with a cellular telephone to permit hands-free operation of the cellular telephone comprising:

an ear piece adapted to be inserted into the external auditory canal of a user to convert vibrations of voice sound information of the user to electrical signals, the ear piece being smaller in size than the interior of the external auditory canal whereby the ear piece does not block the canal;

at least one sensor disposed within the ear piece to sense vibrations, the at least one sensor adapted to sense vibrations within the external auditory canal;

a wireless linkage operatively connecting the ear piece with the cellular telephone; and the ear piece including a speaker being adapted to reside within the external auditory canal of the user.

17. The hands-free device of claim 16 wherein the wireless linkage includes a radio frequency transmitter operatively connected to the ear piece and a radio frequency receiver operatively connected to the cellular telephone.

18. The hands-free device of claim 16 wherein the ear piece includes an air conduction sensor being adapted to convert air vibrations of voice sound information in the external auditory canal of the user to electrical signals.

19. A hands-free device adapted for use with a cellular telephone to permit hands-free operation of the cellular telephone comprising:

an ear piece adapted to be inserted into the external auditory canal of a user to convert air conductive voice vibrations of voice sound information of the user to electrical signals, the ear piece being smaller in size than the interior of the external auditory canal whereby the ear piece does not block the canal;

at least one sensor disposed within the ear piece to sense vibrations and adapted to be placed within the external auditory canal;

a speaker disposed within the ear piece and adapted to be placed within the external auditory canal; and a wireless linkage operatively connecting the ear piece with the cellular telephone.

20. A communication system, comprising:

a cellular telephone;

a short range transceiver operatively connected to the cellular telephone;

an ear piece adapted to be inserted into an external auditory canal of the user;

a fitting portion of the ear piece adapted to be fitted to contours of a posterior superior wall of the external auditory canal;

a bone conduction sensor disposed within the canal and secured to the fitting portion, the bone conduction sensor being adapted to operatively contact the posterior superior wall of the external auditory canal to convert bone vibrations of voice sound information to electrical signals;

a speech processor operatively connected with the ear piece and adapted to receive the electrical signals from the bone conductor sensor and produce a voice sound signal;

a transmitter operatively connected with the speech processor to receive the voice sound signal for transmission;

the ear piece being smaller in size than the interior of the external auditory canal whereby the ear piece does not block the canal.

21. The communication system of claim 20 further comprising an air conduction sensor disposed within the canal and adapted to convert air vibrations of voice sound information to electrical signals.

22. A communication system, comprising:

a cellular telephone;

a short range transceiver operatively connected to the cellular telephone;

an ear piece adapted to be inserted into an external auditory canal of a user;

a fitting portion of the ear piece adapted to be fitted to contours of a posterior superior wall of the external auditory canal;

an air conduction sensor disposed within the canal and secured to the fitting portion and adapted to convert air vibrations of voice sound information to electrical signals, the ear piece being smaller in size than the interior of the external auditory canal whereby the ear piece does not block the canal;

a speech processor operatively connected with the ear piece and adapted to receive the electrical signals from the air conduction sensor and produce a voice sound signal; and a transmitter operatively connected with the speech processor and adapted to receive the voice sound signal for transmission, the transmitter being in operative communication with the short range transceiver.

23. A new communication system, comprising:

a cellular telephone;

a short range transceiver operatively connected to the cellular telephone;

an ear piece adapted to be inserted into the external auditory canal of the user and having a bone conduction sensor and an air conduction sensor for sensing vibrations and converting the vibrations to electrical signals, the ear piece being smaller in size than the interior of the external auditory canal whereby the ear piece does not block the canal along a portion of a wall of the external auditory canal;

a speech processor operatively connected to the ear piece and adapted to receive the electrical signals and produce a voice sound signal;

a transmitter operatively connected with the speech processor and adapted to receive the voice sound signal for transmission, the transmitter being in operative communication with the short range transceiver; and the ear piece including a speaker being adapted to reside within the external auditory canal of the user.

24. A first ever communication system, comprising:

a cellular telephone;

a short range transceiver operatively connected to the cellular telephone;

an ear piece adapted to be inserted into the external auditory canal of a user and having a bone conduction sensor and an air conduction sensor, the bone conduction sensor being adapted to operatively contact a portion of the external auditory canal adjacent the mastoid bone to convert bone vibrations of voice sound information to electrical signals and the air conduction sensor being adapted to convert air vibrations of the voice sound information to electrical signals, the ear piece being smaller in size than the interior of the external auditory canal whereby the ear piece does not block the canal along at least a portion of a wall of the external auditory canal;

a speech processor operatively connected with the ear piece and adapted to receive the electrical signals from the bone conduction sensor and the air conduction sensor and produce a voice sound signal; and a transmitter operatively connected with the speech processor and adapted to receive the voice sound signal for transmission, the transmitter being in operative communication with the short range transceiver.

25. A cellular telephone system comprising:

a cellular telephone transceiver unit having a cellular telephone and a short range transceiver operatively connected to the cellular telephone;

an ear piece adapted to fit an ear of a user and having a bone conduction sensor adapted for operative contact adjacent a mastoid bone of the user to convert voice vibrations of the user to an electrical signal;

a transceiver electrically connected with the ear piece in operative communication with the short range transceiver of the cellular telephone transceiver;

a processor disposed within the ear piece and operatively connected to the bone conduction sensor and the transceiver and adapted for digital processing.

26. The cellular telephone system of claim 25 wherein the ear piece is adapted to fit to the ear such that the ear piece does not block the external auditory canal of the user.

27. The cellular telephone system of claim 25 further comprising a speaker operatively connected to the processor within the ear piece.

28. The cellular telephone system of claim 25 further comprising an air conduction sensor operatively connected to the processor within the ear piece.

29. A handheld communications device, comprising:

a first body;

a second body operatively connected to the first body along a top end of the first body and a top end of the second body;

a cellular phone portion, the cellular phone portion having a key pad attached to the first body;

a personal digital assistant portion having a display attached to the second body;

the first body and the second body having a first position wherein the display is at least partially protected by the first body and the key pad is accessible;

the first body and the second body having a second position wherein the display is fully accessible;

a close range transceiver disposed in at least one of the first body and the second body for sending and receiving voice communications; and the first body operatively connected to the second body such that the first body travels out and away from and over the display when transitioning from the first position to the second position.

30. The device of claim 29 further comprising a plurality of buttons positioned on the second body.

31. A handheld communications device, comprising:

a first body;

a second body operatively connected to the first body;

a cellular phone portion, the cellular phone portion having a key pad attached to the first body;

a personal digital assistant portion having a display attached to the second body;

the first body and the second body having a first position wherein the display is at least partially protected by the first body and the key pad is accessible;

the first body and the second body having a second position wherein the display is fully accessible;

a short range transceiver disposed in at least one of the first body and the second body for sending and receiving voice communications; and the first body operatively connected to the second body such that the first body travels out and away from and over the display when transitioning from the first position to the second position; and wherein the plurality of buttons are accessible in both the first position and the second position.

32. A voice communication system, comprising:

a first body;

a second body operatively connected to the first body along a top end of the first body and a top end of the second body;

a cellular phone portion, the cellular phone portion having a key pad attached to the first body;

a personal digital assistant portion having a display attached to the second body;

the first body and the second body having a first position wherein the display is at least partially protected by the first body and the key pad is accessible;

the first body and the second body having a second position wherein the display is fully accessible;

the first body operatively connected to the second body such that the first body travels out and away from and over the display when transitioning from the first position to the second position;

a short range transceiver disposed in at least one of the first body and the second body for sending and receiving voice communications;

an ear piece for operative communication with the handheld device, the ear piece having at least one sensor for sensing voice sound information;

a speaker; and a short range transceiver operatively connected to at least one sensor and the speaker.

33. A voice communication system, comprising:

a first body;

a second body operatively connected to the first body;

a cellular phone portion, the cellular phone portion having a key pad attached to the first body;

a personal digital assistant portion having a display attached to the second body;

the first body and the second body having a first position wherein the display is at least partially
protected by the first body and the key pad is accessible;

the first body and the second body having a second position wherein the display is fully accessible;

a short range transceiver disposed in at least one of the first body and the second body for sending and receiving voice communications;

an ear piece for operative communication with the handheld device, the ear piece having at least one sensor for sensing voice sound informtion;

a speaker;

a short range transceiver operatively connected to at least one sensor and the speaker; and wherein the plurality of buttons are accessible in both the first position and the second position.

34. The device of claim 32 wherein the ear piece is adapted to fit a use such that any portion of the ear piece extending into the external auditory canal of the user does not block the canal.

35. The device of claim 32 wherein the at least one sensor includes a bone conduction sensor.

36. The device of claim 32 wherein the at least one sensor includes both an air conduction sensor and a bone conduction sensor.

37. The device of claim 32 wherein the ear piece includes a processor operatively connected to the short range transceiver.

38. The device of claim 32 further comprising a plurality of buttons positioned on the second body.

39. A hand held communications device, comprising:

a first body;

a second body operatively connected to the first body along a top edge of the first body and the second body;

a cellular phone portion, the cellular phone disposed within at least one of said first body and second body;

a personal digital assistant portion having a display attached to the second body;

the first and second body having a first position wherein the display is fully protected by the first body;

the first and second body having a second position wherein the display is fully accessible;

a plurality of buttons positioned on the second body that are accessible in both the first position and the second position; and the first body operatively connected to the second body such that the first body travels out and away from and over the display when transitioning from the first position to the second position.

40. The device of claim 39 further comprising a short range transceiver disposed in at least one of the first body and the second body for sending and receiving voice communications.

41. A voice communication system, comprising:

a first body;

a second body operatively connected to the first body along a top edge of the first body and the second body;

a cellular phone portion, the cellular phone disposed within at least one of said first body and second body;

a personal digital assistant portion having a display attached to the second body;

the first and second body having a first position wherein the display is fully protected by the first body;

the first and second body having a second position wherein the display is fully accessible;

the first body operatively connected to the second body along a top end of the first body and a top end of the second body;

a plurality of buttons positioned on the second body that are accessible in both the first position and the second position;

a short range transceiver disposed in at least one of the first body and the second body for sending and receiving voice communications;

an ear piece for operative communication with the handheld device, the ear piece having at least one sensor for sensing voice sound information;

a speaker; and a short range transceiver operatively connected to the at least one sensor and the speaker.

42. The device of claim 41 wherein the ear piece is adapted to fit a user such that any portion of the ear piece extending into the external auditory canal of the user does not block the canal.

43. The device of claim 41 wherein the at least one sensor includes a bone conduction sensor.

44. The device of claim 41 wherein the at least one sensor includes both an air conduction sensor and a bone conduction sensor.

45. The device of claim 41 wherein the ear piece includes a processor operatively connected to the short range transceiver.

46. A personal communication device for providing wireless voice functions and PDA functions, comprising:

a first body having a touch screen display;

a second body having a keypad;

the first body mounted to the second body;

the first body and second body having an open position and a closed position;

the touch screen display being fully viewable to a user in the open position;

the keypad being fully accessible in the open position;

a plurality of buttons connected to one of the first body and the second body, the plurality of buttons being accessible to the user in both the open position and the closed position;

the touch screen display being at least partially viewable by the user in the closed position; and wherein the first body operatively connected to the second body such that the second body travels out and away from and over the display when transitioning between the closed position and open position.

47. The personal wireless communication device of claim 46 further comprising a short range transceiver associated with one of the first body and the second body; and a wireless ear piece in operative communication with the short range transceiver.

48. The personal wireless communication device of claim 47 wherein the wireless ear piece includes a bone conduction sensor.

49. The personal wireless communication device of claim 47 wherein the wireless ear piece is adapted to provide a speaker located within an external auditory canal of a user.

50. A personal communication system for providing wireless voice functions and PDA functions, comprising:

a first body having a touch screen display;

a second body having a keypad;

the first body operatively connected to the second body;

the first body and second body having an open position and a closed position such that both the touch screen display and the keypad are accessible to a user in the open position;

a short range transceiver associated with one of the first body and the second body;

a wireless ear piece associated with the short range transceiver, the wireless ear piece having a second short range transceiver in operative communication with the short range transceiver, a processor electrically connected to the second short range transceiver, a speaker electrically connected to the processor, and at least one sensor for sensing voice sound vibrations electrically connected to the processor.

51. The personal communication system of claim 50 wherein neither the first body nor the second body includes a speaker.

52. The device of claim 32 wherein the ear piece includes a processor operatively connected to the short range transceiver.

53. The personal communication system of claim 50 wherein the at least one sensor includes a bone conduction sensor.

* * * * *